G. L. WERNET & H. A. COLLETT.
ARTIFICIAL TOOTH.
APPLICATION FILED JUNE 27, 1912.

1,102,373.

Patented July 7, 1914.

UNITED STATES PATENT OFFICE.

GEORGE L. WERNET AND HENRY A. COLLETT, OF PHILADELPHIA, PENNSYLVANIA.

ARTIFICIAL TOOTH.

1,102,373.	Specification of Letters Patent.	Patented July 7, 1914.

Application filed June 27, 1912. Serial No. 706,131.

*To all whom it may concern:*

Be it known that we, GEORGE L. WERNET and HENRY A. COLLETT, citizens of the United States, and residents of Philadelphia, county of Philadelphia, State of Pennsylvania, have invented certain new and useful Improvements in Artificial Teeth, of which the following is a specification.

Our invention relates to artificial teeth which are adapted for use in connection with crown and bridge work. In this work it is desirable to provide means whereby teeth which are used are interchangeable; that is to say, if a tooth is broken it is a matter of great convenience as well as of economy to be able to replace that particular tooth by another tooth without the necessity of removing the bridge or other supporting structure.

Our invention has for its particular object an improvement in the construction of means for interchangeably securing artificial teeth upon a bridge or other support in the mouth.

To this and other ends our invention comprehends the construction illustrated in the accompanying drawings hereinafter described in the specification and specifically pointed out in the claims. It will be understood, however, that changes and modifications of the construction may be made within the scope of the claims without departing from our invention.

Figure 1:
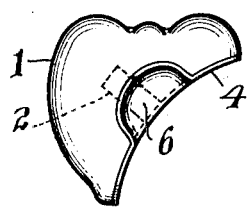
Figure 2:
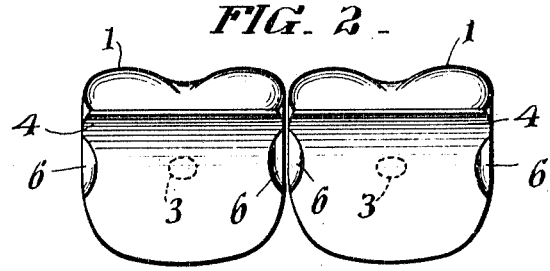
Figure 3:
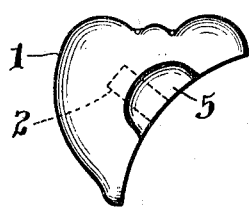
Figure 4:
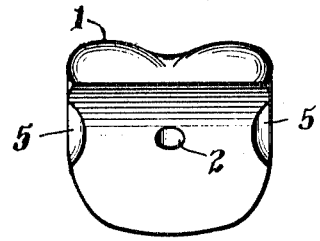
Figure 5:
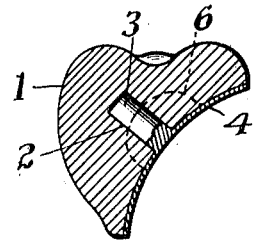
Figure 6:
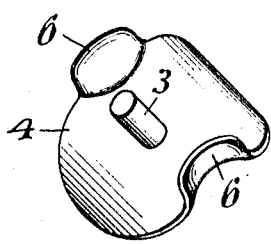

In the drawings:—Figure 1 is a side elevation of a tooth embodying our improved construction and showing a backing in place thereon; Fig. 2 is an inside elevation of two teeth arranged side by side, their backings being in place, and in the position in which they would be arranged preparatory to the flowing of metal in place upon the backings and in between the same to form the bridge or other supporting structure, it being understood that the teeth are removed from the backings during the performance of this operation; Fig. 3 is a side elevation of a tooth embodying our invention with the backing removed; Fig. 4 is a rear elevation of a tooth with the backing removed; Fig. 5 is a vertical sectional view from front to rear of a tooth and its backing; and Fig. 6 is a perspective view of the backing shown in preceding figures.

Before proceeding to a detailed description of our invention, it should be stated that the principle of our invention is applicable to and may be employed in connection with teeth of any shape or contour and is not confined to teeth of the shape and configuration of the tooth illustrated in the drawings.

Referring to the drawings, 1 designates a tooth having a concaved inside surface of curvilinear or arcuate shape as clearly illustrated in Figs. 1, 3 and 5. The central portion of the tooth is provided with a hole 2 for the reception of a pin 3 which projects from the thin backing 4. The opposite edges of the tooth are provided with notches 5 in which ears or lugs 6 formed upon the backing 4 are seated. The shapes of these notches may vary at the will of the manufacturer, always remembering, however, that the shapes of the notches must be such as to permit the removal of a tooth and the placing of another tooth in position in its stead. In other words, the surfaces of the side walls of the notches should be inclined inwardly toward each other so that the transverse width of said notches will increase from the bottom outwardly to the top. When the notches are so shaped it will be understood that one tooth may be readily interchanged with another. They extend from the rear toward the front side of the tooth, terminating at points in rear of such front side or surface. As illustrated these notches are of a depth greater than the thickness of the material of the ears or lugs 6 projecting from the opposite edges of the backing 4. However, if desired, these notches may be of less depth so that when the lugs or ears 6 are seated therein the side surfaces of the latter will be flush with the adjacent surfaces of the edges of the tooth.

In actual practice it is proposed that the teeth will be constructed substantially in the manner illustrated with concaved inside surfaces, with holes 2 for the reception of anchorage pins and with notches 5 in their sides. The backing plates 4 with the anchorage pins 3 and the lugs or ears 6 are made to fit accurately the corresponding parts of the tooth. In using teeth provided with backings embodying our invention the dentist will position the teeth together with the backings in proper relation to each other and will then remove the teeth from the backings, the latter being held in position in any suitable manner, and the material of which the bridge or other supporting structure is to be formed will be flowed upon the backings so as to fill the concavities formed by the curved backing plates and so also as to fill the space between the lugs or ears 6. After the supporting structure is thus formed, the backing plates being substantially integral therewith, the teeth may be placed in position and held in position by the employment of cement in the usual manner. The metal of the backing plates 4 and of the supporting bridge or other structure situated in the said notches and intermediate two adjacent and confronting notches, assists in preventing lateral displacement of the teeth and also supports the same when subjected to the strains incident to mastication. It may be noted here that the notches are situated along portions of the edges of the teeth which are substantially in contact so that the metal of the supporting structure which extends between the said notches is invisible from a position upon the opposite side of the tooth from the said structure. This is of material advantage in that it provides for the support of the tooth without the display of the gold or other metal forming the supporting structure. Should a tooth at any time become broken it may be removed and replaced by another tooth without destroying or in any manner disturbing the supporting structure. The presence of the lugs or ears 6 which are strengthened by the filling in of the metal of the bridge or other supporting structure holds the teeth firmly against lateral displacement and they also form a support against vertical strains which may result from the biting of the teeth together or in any other way.

A tooth embodying our invention is well adapted not only for use in connection with bridge work but also in connection with crown work.

Having thus described our invention, we claim:—

1. An artificial tooth having its rear side hollowed out to form a concaved curved surface, the said concaved surface beginning at a point adjacent to the rear edge of the crown of the tooth and terminating at the base of the same, and the said tooth having at its opposite sides notches with outwardly inclined side walls whereby the depth of said notches decreases from their centers to their outer edges, the said notches terminating at points posteriorly of the front surface of the tooth.

2. An artificial tooth having its rear side hollowed out to form a concaved curved surface which surface begins at a point adjacent to the rear edge of the crown of the tooth and terminates at the base of the same and which tooth has at its opposite sides notches the depths of which decrease from their centers to their outer edges and the said notches terminating at points posteriorly of the front surface of the tooth and which tooth is provided with a hole which extends thereinto from the rear side thereof substantially at right angles to a plane tangent to the said concaved curved surface.

In testimony that we claim the foregoing as our invention, we have hereunto signed our names this 26th day of June, A. D. 1912.

GEORGE L. WERNET.
HENRY A. COLLETT.

In the presence of—
  Geo. H. Weidner,
  Carrie E. Kleinfelder.